Patented Jan. 27, 1925.

1,524,472

UNITED STATES PATENT OFFICE.

ANSON G. BETTS, OF KINDERHOOK, NEW YORK.

CHEMICAL PROCESS.

No Drawing.   Application filed July 11, 1921. Serial No. 483,911.

*To all whom it may concern:*

Be it known that I, ANSON G. BETTS, a citizen of the United States, residing at Kinderhook, in the State of New York, have invented certain new and useful Improvements in Chemical Processes, of which the following is a specification.

This process relates to the production of alumina and aluminum salts and other derived and related chemical products, and has for one of its objects the simplification of operations and improved economy of production thereof. Other objects will appear from the following description of my method.

In my application for Letters Patent, Serial Number 452,759, filed March 16th, 1921 entitled "Chemical processes" I have shown methods of deriving certain products, from a solution of aluminum fluoride and other materials, and have shown therein the preparation of the aluminum fluoride solution by treating aluminous material as clay or bauxite with hydrofluoric acid.

The improvements also relate to the recovery of alkaline compounds, including hydrate, carbonate and aluminate, to the incidental production of calcium fluoride low in silica from common impure fluorspar, to the cheap extraction of silica from such articles as natural graphite and such further chemical processes as may be noted from the following description. Other related objects of my invention are to provide economical methods of producing from common aluminous materials as clay, alumina and if desired useful aluminum salts, and from alkaline-metal salts as common salt and sodium nitrate, acids and alkaline substances and alkaline hydrates, carbonates and aluminates.

In carrying out my process, I may proceed as follows—Clay, calcined if desired, is treated with a solution of hydrofluoric acid which may contain more or less fluosilicic acid, such as is prepared by distilling common fluorspar with concentrated sulphuric acid. The alumina of the clay readily reacts producing a solution of aluminum fluoride, according to the following reactions:

$$Al_2O_3 + 6HF = 2AlF_3 + 3H_2O$$
$$Al_2O_3 + H_2SiF_6 = 2AlF_3 + SiO_2 + H_2O$$

When sodium bisulphate, the so-called nitre-cake, is available at comparatively low prices it is possible to recover alumina from clay, etc., and the sodium of the nitre-cake without requiring substantial quantities of sulphuric acid from outside sources, by the following method:

Aluminum fluoride solution is prepared as described, and this is mixed with hydrofluoric acid and solution of acid sodium sulphate (nitre-cake) as represented by the following equation:

$$AlF_3 + 3HF + 3NaHSO_4 = AlNa_3F_6 + 3H_2SO_4$$

The sulphuric acid solution is evaporated, while the sodium fluoaluminate is treated with lime, and the calcium fluoride is distilled with the sulphuric acid for the regeneration of the hydrofluoric acid.

The precipitate of sodium fluoaluminate is decomposed with lime, producing a solution of sodium aluminate, and an insoluble residue of calcium fluoride, which may be low in silica if lime low in silica is used, the reaction being represented as follows:

$$AlNa_3F_6 + 3CaO = AlNa_3O_3 + 3CaF_2$$

The sodium aluminate solution separated from the calcium fluoride can be utilized in any desired way, of which I will mention its conversion into hydrated alumina and sodium carbonate, by treatment with $CO_2$-bearing gases, represented as follows:

$$2AlNa_3O_3 + 3CO_2 = 3Na_2CO_3 + Al_2O_3$$

The alumina is separated from the solution, which is evaporated or crystallized or both, for commercial soda.

Sodium sulphide may be used in connection with aluminum fluoride solution in the following way. The solutions are mixed preferably in these proportions:

$$4AlF_3 + 3Na_2S + 3H_2O = 2AlNa_3F_6 + Al_2O_3 + 3H_2S$$

The hydrogen sulphide gas given off can be burned to make sulphuric acid, or used for other purposes. The precipitate is decomposed with lime, caustic soda being added to dissolve the alumina, as follows:

$$2AlNa_3F_6 + Al_2O_3 + 2NaOH + 6CaO = 2AlNa_3O_3 + 2AlNaO_2 + 6CaF_2 + H_2O$$

The solution of the aluminates can be worked up into alumina sodium carbonate, or sodium hydrate by methods described herein before or other well-known methods.

It may be observed that the foregoing processes require hydrofluoric acid, which is obtained best by distilling calcium fluoride with sulphuric acid, leaving a residue of calcium sulphate of little or no general value. The calcium fluoride used is recovered by adding lime as described, and indeed the recovered calcium fluoride can be made low in silica so that it is desirable for making commercial hydrofluoric acid with a very small percentage of fluosilicic acid, and accordingly, I prefer to use crude fluorspar in making the hydrofluoric acid to be used for making aluminum fluoride solution, and dispose of or use the relatively pure calcium fluoride for other purposes as far as practicable. But in any event, lime is added to the operations, which disappears as calcium sulphate, and the above processes accordingly consume sulphuric acid and lime, rejected as calcium sulphate.

Having reference to the purification of natural graphite as being incidentally possible in connection with these processes it may be noted that the said material, containing unremoved silica and silicates, may be leached with the crude hydrofluoric acid, before the same is used in treating clay. In this manner silica and kaolin may be dissolved from the graphite, and the resulting solution then used for treating clay, with the result that any silica taken up from the graphite is precipitated with the clay residues and removed.

Taking into consideration that potassium salts in the crude state are more or less contaminated with other salts, and in some cases in too small quantities in brines, etc., to be commercially recoverable, I consider it more advantageous to treat the relatively cheaper low-grade potassium-bearing saline materials, effecting a concentration of the potassium by precipitation, as potassium fluoaluminates, or fluoaluminate, than to work with the concentrated, purified, expensive potassium salts.

To avoid loss of aluminum salt in the solution from which the potassium fluoaluminate is precipitated I prefer to use with the aluminum fluoride solution, more or less hydrofluoric acid, to effect the reaction $$AlF_3 + 3KCl + 3HF = K_3AlF_6 + 3HCl$$

thus producing an acid reaction to prevent the co-precipitation of magnesium compounds, present in such low-grade potash materials and at the same time avoiding the loss of aluminum salt in solutions too impure or too dilute to make it practicable to treat the same by other methods for the recovery of such salt or its constituent acid and alumina.

In order to avoid the operating of hydrofluoric acid distilling retorts, and condensation and storage and handling of hydrofluoric acid, to be used in the extraction of aluminous materials with the production of solutions containing aluminum wholly or in large part as fluoride for the process as set forth in the foregoing application thereof, I treat aluminous material as clay or bauxite with sulphuric acid and a fluoride, preferably calcium fluoride, in presence of water. In all probability, the sulphuric (or other acid substituted therefor) first reacts with the calcium fluoride with the formation of hydrofluoric acid and calcium sulphate, and the acid as generated is then absorbed by the alumina present as aluminum fluoride. The aluminous material can also be attacked directly by the sulphuric acid producing aluminum sulphate, and the sulphuric acid can also react with the dissolved aluminum fluoride, and I prefer to write the reaction as $$Al_2O_3 + 3H_2SO_4 + 2CaF_2 = Al_2F_4SO_4 + 2CaSO_4 + 3H_2O$$

although there may be other reactions as $$Al_2O_3 + 3H_2SO_4 + 3CaF_2 = 2AlF_3 + 3CaSO_4 + 3H_2O$$

Any sulphate of aluminum present in the sulphuric acid used or added intentionally or entirely substituted for the sulphuric acid will also react with calcium fluoride probably best represented as follows:

$$Al_2(SO_4)_3 + 2CaF_2 = Al_2F_4SO_4 + 2CaSO_4$$

The calcium sulphate produced being practically insoluble may be filtered from the resulting solution or separated in any desired way along with the silica and other residue of the aluminous material. In case it is desired to save the calcium sulphate, it is practicable to first convert the aluminous material and the sulphuric acid into aluminum sulphate in a previous operation in well-known way or ways, filter, purify or separate a clean solution and then cause the solution to react with calcium fluoride. In case of substituting barium or strontium fluoride for calcium fluoride, the sulphate produced in an analogous way being more valuable, it then becomes especially desirable to so conduct the operation in two stages, or to use aluminum sulphate in place of sulphuric acid and alumina.

In connection with the question of elimination of iron, it can be noted here that iron precipitated with the double fluorides described is not especially objectionable, since in decomposing with lime, alkali aluminates are obtained in which iron is not soluble, so that a separation is effected, and the iron left with the calcium fluoride may be removed therefrom by acid treatment if desired.

I am aware that alkalies and alumina have been produced by decomposing natural cryolite, which is sodium fluoaluminate AlNa₃F₆, with lime in the sense of this reaction.

thus producing soluble sodium aluminate from which may be obtained alumina and caustic or carbonated soda. This process has not however been a clean reaction, or easy to carry out. The mineral is insoluble and probably no amount of grinding will bring it all into reaction with lime in the wet way. If the reaction is effected by furnace treatment, the cost is greater, and the reaction still not a clean one. The calcium fluoride by-product has not been of high or even of good quality Contrasted to the well-known defects and difficulties in the process of decomposing cryolite with lime, the precipitated sodium fluoaluminate of my process reacts quickly with lime in the wet way and gives products of good grade including a desirable and valuable quality of calcium fluoride as distinguished from the calcium fluoride of the older process. I am thus enabled to begin with very low grades of natural calcium fluoride and of aluminous materials and cheap alkaline-metal salts producing alkalies, purified alumina and relatively high-grade calcium fluoride.

What I claim as new and desire to secure by Lettters Patent, is,

1. Process of producing alumina, alkali and calcium fluoride, which consists in precipitating from a solution of a soluble aluminum-fluorine compound and of a common alkaline-metal salt, insoluble alkaline-metal fluoaluminate, effecting a clean decomposition of the said precipitate with lime in the wet way, producing insoluble calcium fluoride and solution of alkaline-metal aluminate, and recovering alumina and alkali from said resulting solution by a chemical method.

2. Process of producing alumina, soda alkali and calcium fluoride, which consists in precipitating from solution of a soluble aluminum-fluorine compound and of a sodium salt, insoluble sodium fluoaluminate, efficiently decomposing the precipitate with lime in the wet way, producing calcium fluoride and solution of sodium aluminate, and recovering alumina and soda alkali from the resulting solution by a chemical method.

3. Process of producing solution of alumina and soda, which consists in precipitating from solution of soluble aluminum-fluorine compound and of a sodium salt, sodium fluoaluminate, and efficiently decomposing the sodium fluoaluminate with lime in the wet way, and separating the insoluble calcium fluoride from the resulting solution of soda and alumina.

4. Process of producing alumina and soda alkali, which consists in precipitating from solution of soluble aluminum-fluorine compound and sodium salt, insoluble sodium fluoaluminate, efficiently decomposing the precipitate with lime in the wet way, producing calcium fluoride and solution containing sodium aluminate, separating the calcium fluoride from the solution, and producing from the solution alumina and soda alkali by a chemical method.

In testimony whereof I affix my signature.

ANSON G. BETTS.